May 29, 1934.                G. E. NERNEY                1,960,791
                          EYEGLASS CONSTRUCTION
                            Filed July 12, 1930

George E. Nerney
INVENTOR

BY Janney, Blair & Curtis
ATTORNEYS

Patented May 29, 1934

1,960,791

UNITED STATES PATENT OFFICE 1,960,791

EYEGLASS CONSTRUCTION

George E. Nerney, Attleboro, Mass., assignor to Bay State Optical Company, Attleboro, Mass., a corporation of Maine Application July 12, 1930, Serial No. 467,473

12 Claims. (Cl. 88—42)

This invention relates to eye-glass construction.

One of the objects thereof is to provide a practical device of the above nature of a construction which shall be light and yet strong and durable. Another object is to provide a device of the above nature in which the metal is so disposed as to reduce a breakage of the lenses to a minimum. Another object is to provide a construction of the above nature which shall be simple and readily manufactured and yet possess many advantages in use. Other objects will be in part obvious and in part pointed out hereinafter.

The invention accordingly consists in the features of construction, combinations of elements, and arrangements of parts which will be exemplified in the following specification, and the scope of the application of which will be indicated in the appended claims.

In the accompanying drawing in which is shown one of the various possible embodiments of this invention, Figure 1 is a front elevation thereof;

Similar reference characters refer to similar parts throughout the several views of the drawing.

Figure 1:
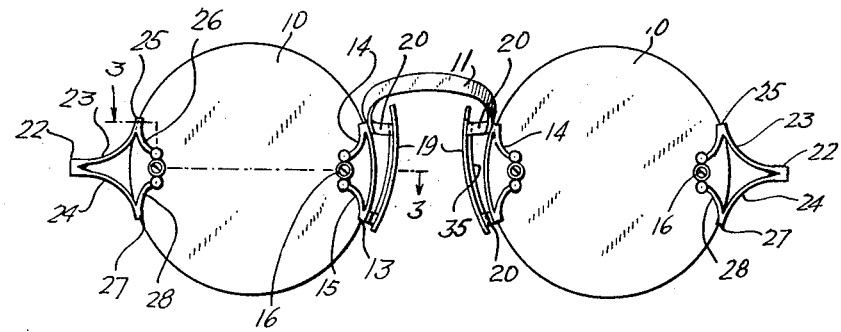

Referring now to this drawing in detail, there are shown eye-glasses of the rimless type comprising lenses 10, bridge 11 and temples 12. As the construction upon both sides of the eye-glasses is the same, that upon one side only will be described.

At the front of the lens 10 whose edge rests flat on the inner surface of a frame portion 13 substantially following the periphery of said lens there is formed upon or rigidly secured to the part 13 a pair of arms 14 and 15, the ends of which are formed integral with or rigidly secured to an eye 16. A second pair of arms 14 and 15 extend from the rear of said member 13 in registry with the first pair of arms 14 and 15 and are in the same way connected at their ends to an eye member 17 in registry with the eye 16. In this manner there is provided a saddle which embraces the inner portion of the lens free from parts of such width as to obscure vision, this saddle being built up by the member 13 with a pair of arms 15 extending upwardly from its lower end, and a pair of arms 14 branching downwardly from its upper portion, the two front arms of each pair terminating in eye 16 whereas the two rear arms terminate in eye 17.

The lens being drilled in registry with the opening in the eyes 16 and 17, a screw 18 passes through the several parts and is tapped into the rear eye 17. This screw is thus spaced a substantial distance from the adjacent edge of the lens, and with the associated parts above described, forms a connection in which the lens is given a maximum strength to meet the various stresses to which the eye-glasses are exposed in practical use. It may here be noted that although the screw possesses certain advantages in this relation as in the matter of drawing the parts firmly into engagement with the glass, nevertheless, many advantageous features are gained if a rivet or pin be substituted for the screw, and it is to be understood in this connection that the expression "retaining member" is used in a broad sense to cover any device of this nature.

The bridge 11 has at each end a dependent portion 20 which is connected to frame portion 13 at saddle 33 by any convenient securing means. Said depending portion 20 is then extended rearwardly and downwardly to terminate in a like connection at saddle 34 on frame portion 13.

By the above construction the depending portion 20 forms a nose-engaging member 35. An elongated piece of composition or metal of any convenient shape or form is secured to said nose-engaging portion 35 by means of rivets 32 to form nose pads 19. It should be understood that this construction is not limited to rivets, for it has been found advantageous to employ screws, solder and welds in particular instances. It should be noted that depending portion 20 is sufficiently flexible to allow for the adjustment of nose-engaging member 35 to any desired position. It may also be noted that the term "rearward" is used to denote a direction toward the face of the wearer, and the term "downward" denotes such a direction with the glasses in use.

Figure 2:
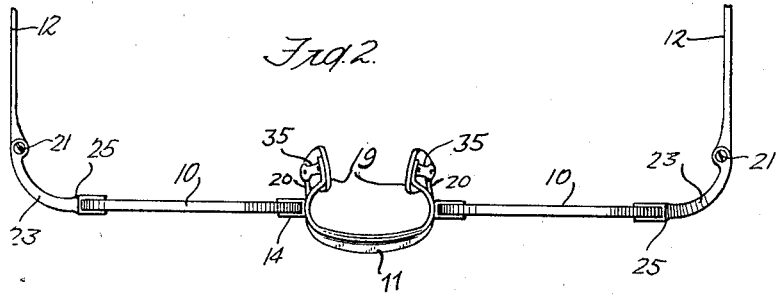
Figure 2 is a top plan view of the parts shown in Figure 1.
Figure 3:
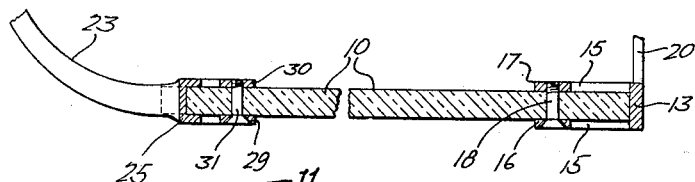
Figure 3 is a sectional view taken on the line 3—3 of Figure 1, and showing the parts upon an enlarged scale.
Figure 4:
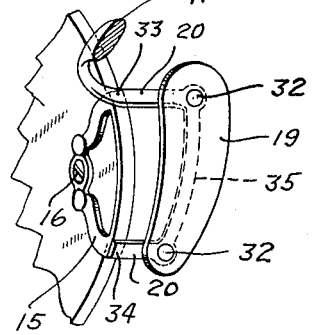
Figure 4 is a detail perspective of one lens showing the bridge and nose-engaging construction.

Considering now the construction at the outer end of the lens the temple 12 is hinged as at 21 to a metallic member 22 which includes a pair of divergent arms 23 and 24 curving upwardly and downwardly away one from the other and both curving inwardly in substantial registry as shown in Figure 2. Arm 23 terminates in a short saddle portion 25 embracing the adjacent edge of the lens and having extending therefrom at the front and rear surfaces of the lenses a pair of curved arms 26 in registry as viewed from the front. In like manner, the arm 24 leads to a short saddle portion 27 from which a pair of arms 28 extend upwardly in substantial engagement with the front and rear surfaces of the lenses. At the front of the lenses the arms 26 and 28 terminate in or are rigidly secured to an eye 29 and at the rear of the lenses the arms 26 and 28 terminate in a registering eye 30. These eyes are connected one with the other as by the screw 31 passing through the lens and tapped into the eye 30. What has been said with reference to the screw 18 applies to the screw 31, and it will also be seen that the arrangement of parts at the outer edge of the lens protects the lens against breakage in a manner similar to the construction adjacent to the bridge. Furthermore, the outwardly curved arms 23 and 24 tend to guard the lenses if the eye-glasses be dropped, and also due to their individual thinness and spaced relation prevent obscuring of the vision at this point.

One advantageous feature of the construction above described is its ability to resist twisting stresses between the fittings. That is, if the temples be forced upwardly or downwardly with respect to each other or to the bridge, each of these fittings embraces so substantial a portion of the lens that the chance of breaking out a portion of the glass is minimized. The temple, for example, is connected to a part which grips and interlocks with the edge of the lenses at points extending a considerable arc about its circumference, thus transmitting the stress to the lenses as a whole without even depending upon connection through the screw.

It is to be understood that although the connection of these various parts is referred to as "rigid", nevertheless, the metal is not brittle and will yield to some substantial extent, thus aiding in cushioning and permitting adjustment. It is also to be noted that the term "fitting" is used in a broad sense to denote such conventional parts of eye-glass frames as temples, bridges and the like.

As various changes might be made in the construction herein described, and as this invention might be embodied in materially different arrangements, it is to be understood that all matter herein set forth or shown in the accompanying drawing should be interpreted as illustrative and not in a limiting sense.

I claim:

1. In eye-glass construction, in combination, a retaining member adapted to pass through the lens, a bridge, a member connected with said bridge adapted to rest against the adjacent edge of the lens, a pair of arms rigidly connected to said member and engaging one surface of the lens, and a second pair of arms rigidly connected to said member engaging the other surface of the lens and converging in registry with said first pair of arms towards and terminating at said retaining member and secured thereto, a continuation of said bridge being secured to said second-mentioned member at a point spaced from said first-mentioned bridge connection and extending rearwardly to form eye-glass supporting members.

2. In eye-glass construction, in combination, a temple, a lens, a retaining member passing through the lens, connecting means including a pair of arms converging toward and connected with the temple at a point spaced away from and rearwardly of the edge of said lens, and two pair of arms connected to said last-mentioned arms respectively embracing the edge of the lens and converging toward and connected with said retaining member.

3. In eye-glass construction, in combination, a temple, a lens, a screw passing through the lens and connecting means comprising a pair of arms curved outwardly and rearwardly with respect to the lens and connected with the temple and comprising also two pair of arms each pair respectively embracing an edge of the lens at spaced points and converging toward and interlocking with said screw at the front and rear of the lens.

4. In eye-glass construction, in combination, a lens, a retaining member passing through said lens, a pair of arms engaging the opposite surfaces of said lens and extending about the edge thereof terminating at and connected to said retaining member, a second pair of arms engaging the opposite surfaces of said lens and extending about the edge thereof at a point spaced from said first pair of arms terminating at and connected to said retaining member, and means including a bridge and a nose-engaging member secured to both of said pairs of arms at spaced points substantially adjacent said edge of said lens.

5. In eye-glass construction, in combination, a lens, a member extending through said lens at a point spaced from the edge thereof, a saddle including two arms adjacent the opposite surfaces of said lens converging inwardly from the edge of said lens and connected to said member, a second saddle including a pair of arms adjacent the opposite surfaces of said lens and spaced from said first saddle, said last-mentioned arms being connected to said member, and a pair of parts connected to said saddles at points adjacent the edge of said lens, said parts extending outwardly and converging to form an endpiece.

6. In eye-glass construction, in combination, a lens, a pair of arms in engagement with the edge of said lens at spaced points and converging inwardly along one surface of said lens to a point on said lens spaced from said edge, means extending through said lens at said last-mentioned point and connected to said arms, and a pair of parts connected to said arms at points adjacent said edge of said lens, said parts converging to a point spaced from and to the rear of said edge and connected one with the other to form an endpiece.

7. In eye-glass construction, in combination, a lens, a retaining member extending through said lens at a point spaced from the edge thereof, a pair of saddles embracing the edge of said lens at spaced points and extending inwardly, said saddles being connected with said retaining member, and a pair of parts connected to said saddles at points adjacent the edge of said lens, said parts converging and extending outwardly and rearwardly to terminate in temple-connecting means.

8. In eye-glass construction, in combination, a bridge, a lens, a retaining member adapted to pass through said lens, a connecting member secured to said bridge and including a pair of arms converging toward said retaining member and secured thereto, and means secured to one of said arms and said bridge and spaced from the edge of said lens to form a nose-engaging member.

9. In eye-glass construction, in combination, a lens, a part extending through said lens at a point spaced from the edge thereof, a pair of saddle members embracing the edge of said lens at spaced points and converging inwardly, said saddle members being connected to said part, and an endpiece comprising a pair of rearwardly extending converging arms connected to said saddle members substantially at said spaced points substantially adjacent the edge of said lens.

10. In eye-glass construction, in combination, a lens, securing means associated with said lens and spaced from the edge thereof, a saddle member engaging the edge of said lens and comprising a pair of arms extending in registry with one another over opposite surfaces of said lens and terminating at and secured to said securing means, a second saddle member engaging the edges of said lens at a point spaced from said first-mentioned saddle member and comprising a pair of arms extending in registry with one another over opposite surfaces of said lens and terminating at and secured to said securing means, a pair of members each secured to one of said saddle members at its point of engagement with said lens and extending from said lens in converging relation, and an endpiece secured to said last-mentioned members at their point of convergence.

11. In eye-glass construction, in combination, a lens, securing means extending through said lens and spaced from the edge thereof, a fitting comprising a body portion positioned away from and rearwardly of said lens, a pair of arms integral with said body portion and extending therefrom in curved spreading relation to spaced points adjacent the edge of said lens, and a bracket member engaging the edge of said lens and having spaced pairs of arms engaging opposite surfaces of said lens and converging toward and terminating at said securing means, said first-mentioned arms being secured to said bracket member at the points of engagement of said bracket member and said lens.

12. In eye-glass construction, in combination, a lens, securing means associated with said lens, a bridge, connecting means including pairs or arms forming saddles converging in registry toward and attached to said securing means, and an extended part of said bridge secured to said saddles and spaced from the edge of the lens and continuing rearwardly to form a nose guard.

GEORGE E. NERNEY.